United States Patent [19]
Lambright

[11] Patent Number: 5,879,236
[45] Date of Patent: Mar. 9, 1999

[54] SYSTEM METHOD AND MEDIUM FOR SECTOR WINDOWING

[75] Inventor: Patrick B. Lambright, Redmond, Wash.

[73] Assignee: Starwave Corporation, Bellevue, Wash.

[21] Appl. No.: 732,750

[22] Filed: Oct. 18, 1996

[51] Int. Cl.⁶ ........................................... A63F 9/24
[52] U.S. Cl. ........................................................ 463/42
[58] Field of Search ................................ 463/40, 41, 42, 463/43, 44, 16, 29; 395/182.01, 182.02, 182.03; 364/130, 131, 132, 133, 134, 137, 138

[56] References Cited

U.S. PATENT DOCUMENTS

5,129,080  7/1992  Smith ................................ 395/182.02
5,636,209  6/1997  Perlman .................................... 463/42
5,668,950  9/1997  Kikuchi et al. .......................... 463/42
5,707,286  1/1998  Carlson .................................... 463/16

Primary Examiner—George Manuel
Attorney, Agent, or Firm—Hale and Dorr LLP

[57] ABSTRACT

A sector windowing system, method and medium for reducing the number of transmission to various users in a multi-user computer game are disclosed. In various embodiments, the disclosed system, method, and medium determines what characters should receive notification of activities of other characters based on the proximity of the characters in the game, the load on a server's system and current backlog in the server's queue for each receiving user. The disclosed method and system allows a large number of users to be aware of their surroundings while reducing the number of transmission required for slow and unaffected characters.

46 Claims, 7 Drawing Sheets

SYSTEM METHOD AND MEDIUM FOR SECTOR WINDOWING

BACKGROUND OF THE INVENTION

1. Technical Field

This invention relates generally to computer software processing which supports interactive multi-player computer games. More particularly, the invention provides an enhanced way of determining which game characters should receive updated information as available bandwidth decreases.

2. Related Information

Interactive multi-player computer games such as Doom™, Quake™, Duke Nukem 3-D™ are well known. In such games, players can navigate through various "rooms" requiring player interaction in the form of uncovering clues, answering questions, and making selections. In certain versions of these games, each player is provided with a dedicated personal computer which interacts with a central computer over the Internet or other communication medium. New players can enter a game already in progress, while others can exit at their choosing.

As one example, a game might provide a room where a large number of players represented by characters can interact, exchange messages, and engage in group actions. An example of room might be a "submarine" room which can hold a limited number of people at a time, wherein each player controls certain activities in the room. Based on the skills of each player, the submarine can be made to move toward various destinations and, upon successful arrival at a particular location, one or more players can move from the submarine into a different room. The players can play the game from different geographic locations and yet, because of coordination in a central computer program, each player is made aware of the actions of the other players.

Figure 7:
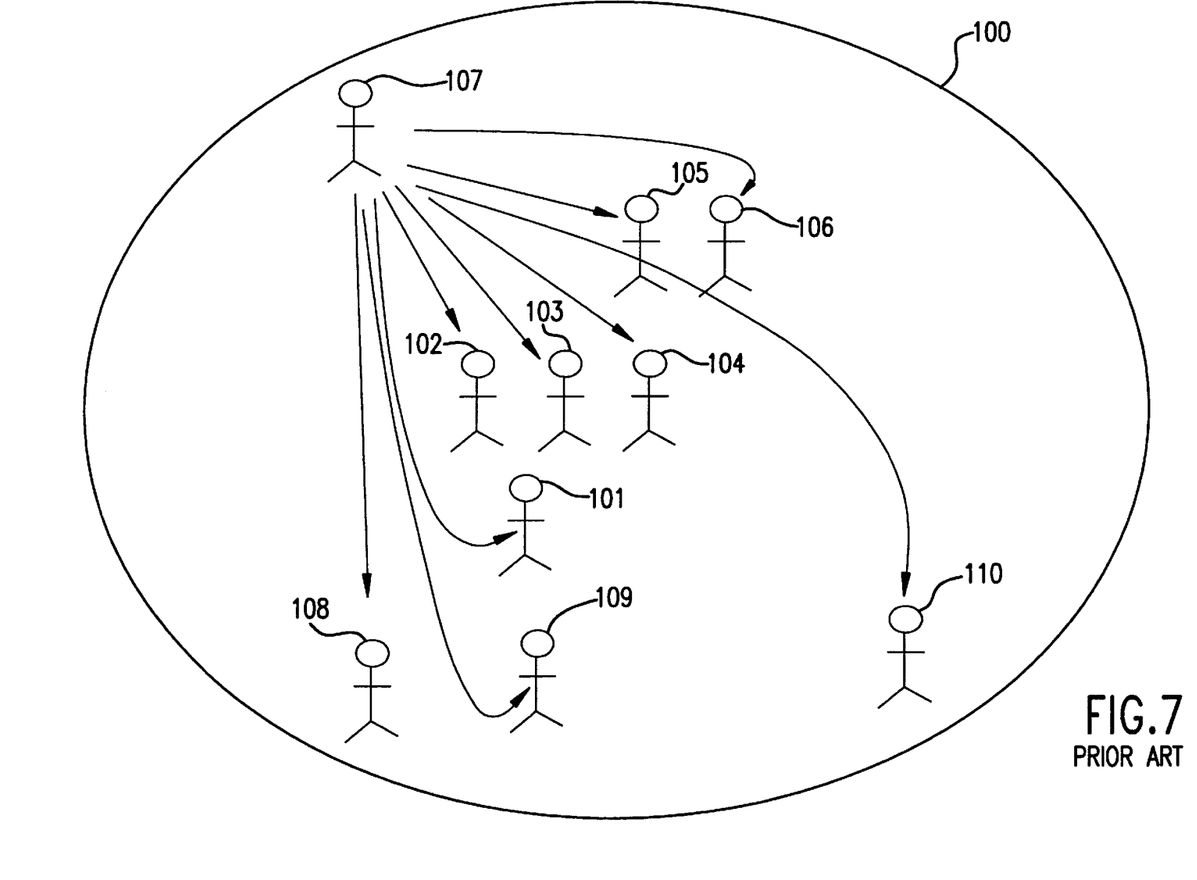
FIG. 7 shows a conventional game sector which includes a variety of characters.

FIG. 7 shows a conventional arrangement of characters 101–110 in room (or sector) 100. As character 107 moves about in room 100 or makes statements about its surroundings, each and every action taken by character 107 is transmitted to all of the other characters in the same room 100. The transmission of these messages are represented by the arrows from character 107 to each and every other character.

Several problems exist with the conventional arrangement depicted in FIG. 7. For one, it is not uncommon for a very large number of game players (hundreds or thousands) to simultaneously play one game. When a large number of players participate in a game, the server supporting room 100 has to transmit each and every action from each and every character to each and every other character. For a few characters, a server supporting room 100 may handle the messages properly. However, with numerous characters, the server supporting room 100 bogs down with the numerous messages transmitted between characters. The extra load on the server becomes cumulative with every passing instant as more messages keep coming. This situation can force the server to cancel its connections with characters or even shut itself down. Thus, conventional multi-player games are resource-intensive as they may quickly bog down a server with multiple players playing the game. Due to the increasing popularity of interactive computer games, this problem has become more widespread. Accordingly, a need exists to provide a more efficient and stable platform for interactive multiplayer game systems.

Also, a single player may on occasion experience a slowdown in its computer's processing ability. For example, the player's computer's its connection to the server supporting room 100 may become temporarily disabled. Alternatively, the player may be using a slow modem connection. If disabled or delayed for any length of time, the messages attempted to be sent to the player will overload the server, the player will be considered dead and the player will be cut off from playing the game. This is an unpleasant occurrence for the player. Accordingly, a need exists to minimize the likelihood of a player being cut out of a game because of a temporary delay at the player's machine.

SUMMARY OF THE INVENTION

The present invention overcomes the aforementioned problems by providing a system, method and medium which automatically determines which characters should receive messages from an active character. For example, as some characters become more geographically distant (in the game perspective) from the active character, the likelihood that these characters will receive messages from the active character diminishes. More specifically, various embodiments of the inventive system, medium, and method provide a way of reducing the number of messages transmitted to other characters based on the load on the sector as well as the backlog of messages to be sent to each character (a sector being some type of playing area such as a room(s), platform (s), arena(s), etc.). The greater the load, the less of a chance that two characters at a given distance will be allowed to exchange information. Other applications of the embodiments of the present invention include business-type, team simulations. Other features and advantages will become evident through the following detailed description, figures and claims.

DETAILED DESCRIPTION

Figure 1:
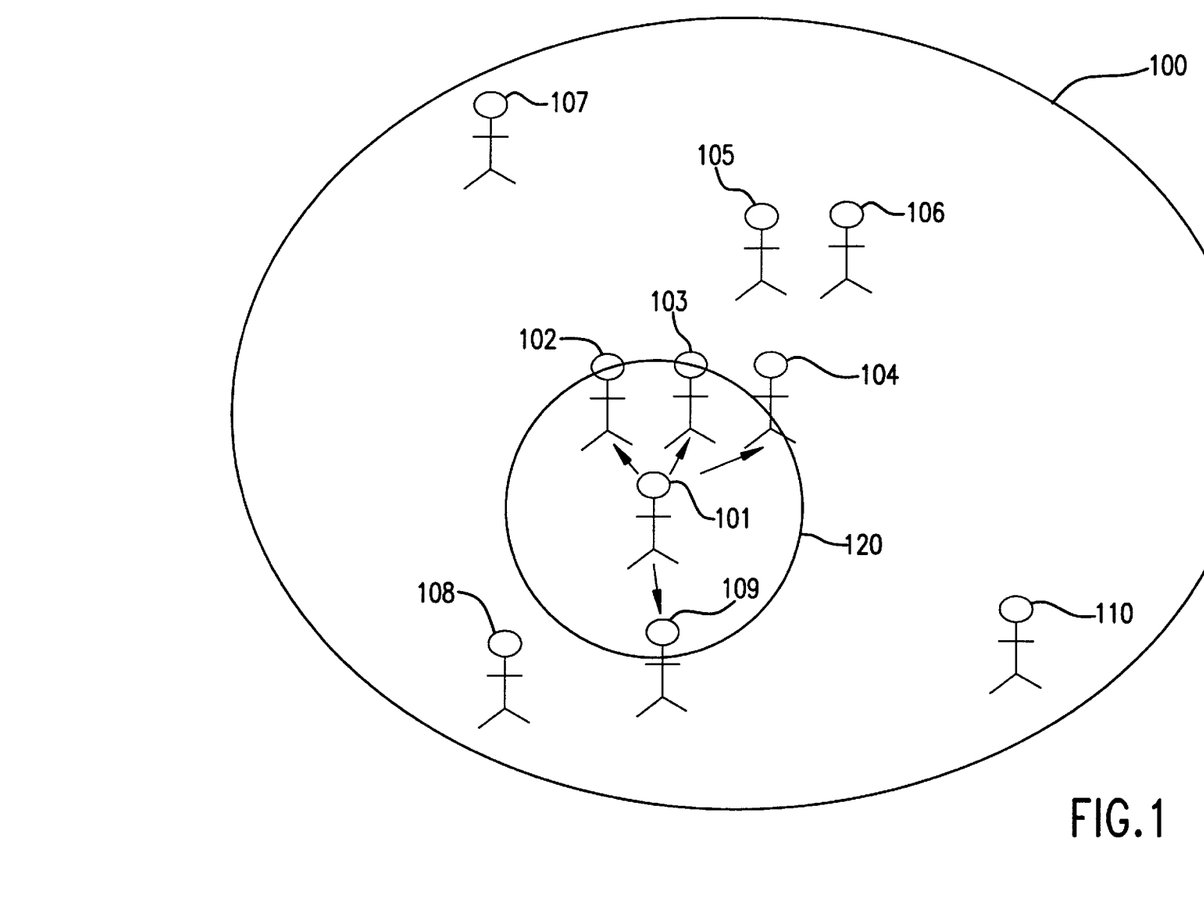
FIG. 1 shows a sector with characters employing various principles of the present invention.

Reference will now be made to FIG. 1 which shows in block diagram for a system employing the principles of the present invention. FIG. 1 shows a plurality of characters 101–110 in sector 100. Surrounding character 101 is activity window 120. While not shown in this figure, each character has an activity window (or activity bubble) which indicates the range within which the character will receive activity messages from other characters which fall within the window. As each character's activity window 120 grows and includes more characters, the number of characters from whom it will receive activity messages increases. Likewise, activity messages from characters outside character 101's activity window 120 will not be transmitted to character 101.

While FIG. 1 shows activity window 120 as a two-dimensional shape, in three dimensions, the activity window 120 appears as a bubble or polyhedron surrounding character 101. For the purpose of simplicity, activity window 120 is described in reference to a planar environment. It is understood that the embodiments of the invention are applicable to three dimensional environments as well.

A character is intended to encompass a variety of representations of the player. In accordance with embodiments of the present invention, a player may be represented as a person, an animals, an object, etc.

To maintain the proper relationship between characters of multi-player computer games, messages are commonly transmitted back and forth between characters. Embodiments of the present invention contemplate a variety of these messages transmitted between characters. These messages include status messages (e.g., "I'm alive", "I quit", or "I now look like . . .", etc. ), communication messages (e.g., "hi, my name is . . .") and movement messages (e.g., "I'm moving to location . . . at . . . speed", "I'm located at location . . .," etc.). As some messages are more important than others, the implementation of the system described herein includes a hierarchy of messages. Some messages between characters have relevance only when the characters are in close physical (game-wise) proximity to each other. For example, character 101 may not care where character 110 is moving to at the present time or what character 110 is currently saying (because of the distance separating the two characters 101 and 110). Accordingly, some messages are transmitted only to characters to whom the message is relevant because of distance.

Embodiments of the present invention contemplate at least two schemes of reducing the number of messages transmitted to characters. The first scheme transmits a character 101's activities to the other characters based on the degree to which sector 100 is properly handling all activities of all characters 101–110. The second scheme transmits character 101's activities based on which characters in a particular area are able to handle additional information. Various embodiments of the present invention incorporate both schemes in determining and transmitting a character 101's activities to selected ones of the other characters 102–110.

Figure 2:
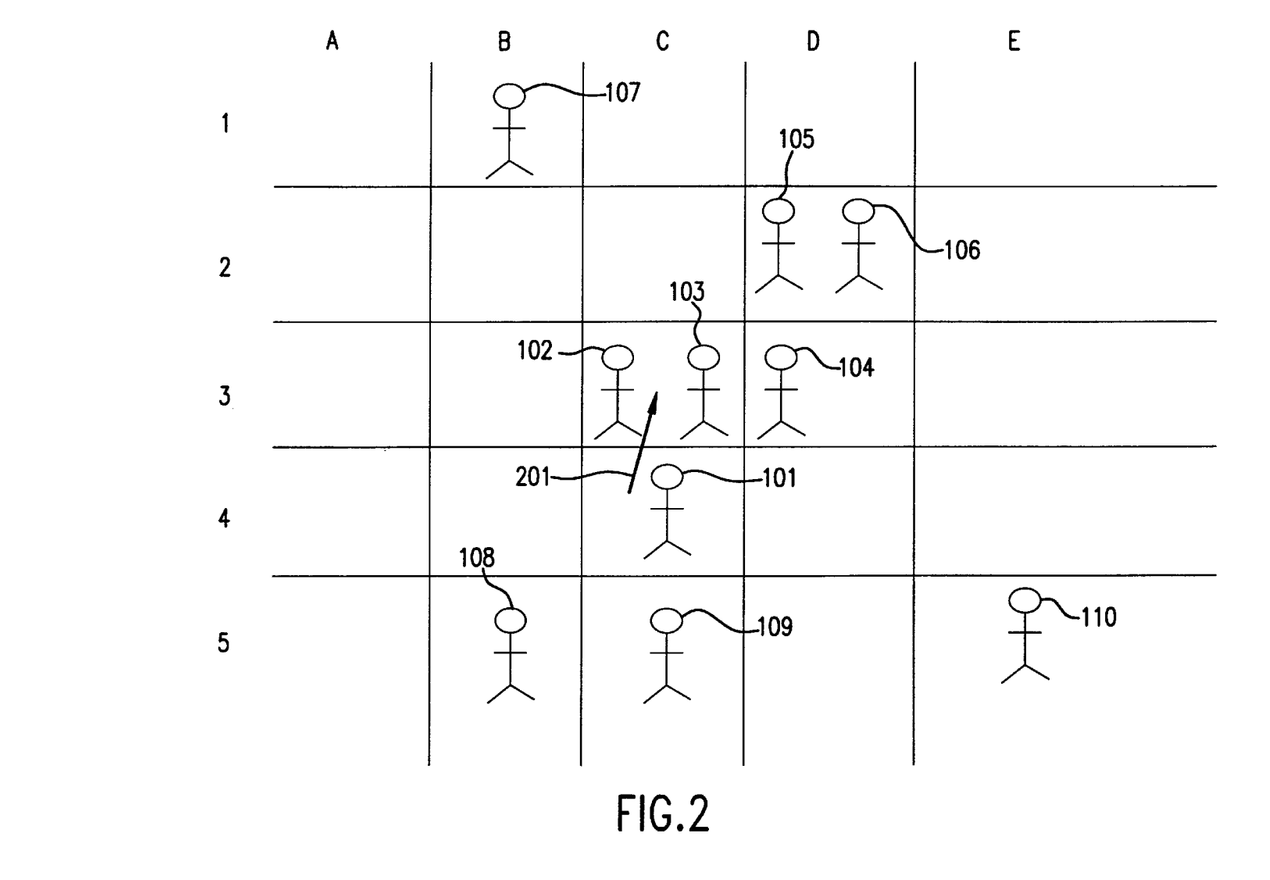
FIG. 2 shows a sector with characters additionally including an underlying grid as contemplated by embodiments of the present invention.
Figure 5:
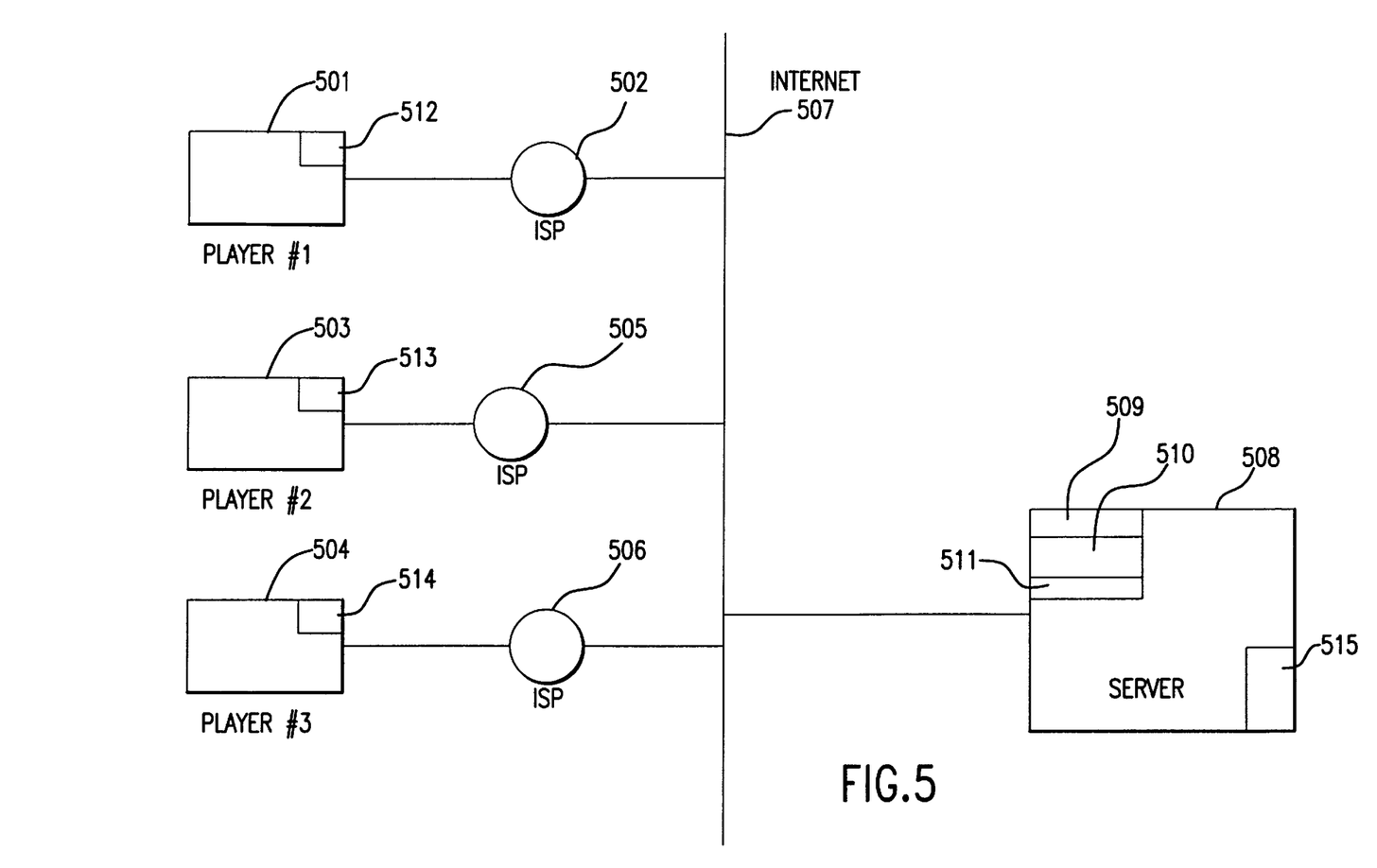
FIG. 5 shows a hardware diagram of interconnecting computers as contemplated by embodiments of the present invention.

The first scheme of determining which characters should receive an activity message from character 101 is described in greater detail with respect to FIGS. 2 and 5. FIG. 5 shows a block diagram of a system employing the principles of the present invention. As shown in FIG. 5, a plurality of game players (PLAYER #1 through PLAYER #3) are each provided with a computer (elements 501, 503, and 504) which may be situated at geographically diverse locations. Each computer 501, 503, and 504 has a memory portion 512, 513, and 514, respectively. According to embodiments of the present invention, each of these computers 501, 503, and 504 preferably comprises any of a variety of well-known "personal" computers including a central processing unit, memory, input devices and a display. Also, each of these computers is coupleable to the Internet 507 through Internet Service Providers 502, 505, and 506. Examples of such personal computers include an IBM-compatible, Intel™ Pentium-based Dell Dimension™ series of computers from Dell Corporation of Austin, Tex.

Each computer 501, 503, and 504 executes a client game component which communicates via Internet 507 with a server computer 508 (hereinafter, server 508). Server 508 may be, for example, a Pentium™ P200 dual processor as made by the Hewlett-Packard Corporation. Each game component may be obtained by, for example, downloading computer software via the Internet or by retrieving the game component from a CD-ROM or other storage media. Each server 508 preferably comprises an Intel-based microprocessor executing the Windows NT™ operating system (from Microsoft™ of Redmond, Wash.) and including suitable memory 515. Well known communication protocols, including TCP/IP are used for communication between the computers 501, 502, and 503 and server 508. Any of various computer languages such as C++ are useable to implement the inventive features of the present invention.

The operation of the computers of FIG. 5 is described in relation to the actions of character 101 of FIG. 2. FIG. 2 shows sector 100 (from FIG. 1) divided into manageable portions (hereinafter, referred to as "grid areas"). Each grid area (e.g., C3) may or may not contain any characters. The shape of each grid area may include a variety of shapes (e.g., squares, rectangles, polygons, etc., or in three dimensions, spheres, ellipses, or polyhedrons, etc.). Accordingly, the term "sub-section" is intended to refer to a grid area, regardless of its shape. For simplicity, the portions of the sector will be referred to as "grid areas". For the purposes of this example, it is understood that Player #1 controls character 101 from computer 501. Also, each of player #'s 1–3 views sector 100 from its own perspective. Referring to FIG. 2, character 101 moves from grid area C4 to grid area C3. The direction of movement of character 101 is shown by arrow 201. As viewed from operating components, player #1's computer 501 transmits a movement command as represented by arrow 201 to server 508 via Internet 507.

Next, server 508 determines to what extent the received message from Player #1 contains information about character 101 which would need to be relayed to Player #'s 2–3. In this case, as the message received from computer 501 is a type of message which does not have to be relayed to each and every one of the characters 102–110, server 508 determines which characters would receive the most benefit from receiving this movement information regarding character 101 and transmits the movement information to these characters.

According to embodiments of the invention, a scheme for determining which characters need to be updated based on the characters in the grid areas is by determining which characters exist in grid areas surrounding the grid of interest. In this case, as character 101 moved into grid area C3, grid area C3 is the primary grid area of interest. The system notes which characters are in the scanned grid area then proceeds to the next grid area.

The next grid area is determined by noting the direction of character 101's movement and following the movement to the next grid area. Here, as character 101 moved "up" into grid area C3, the system preferably follows the direction of movement to the next grid area, in this case, C2. The identities of any characters contained within grid area C2 are determined as they are in the next "important" grid area after the first grid area (here, C3).

According to embodiments of the present invention, the preferable way of scanning through the surrounding grid areas is to spiral out and away from character 101 until all relevant grid areas have been scanned. In various embodiments, the number of surrounding grid areas to be scanned is nine. This means that, as character 101 moved into grid area C3, the following grid areas will also be scanned: C2, D2, D3, D4, C4, B4, B3, and B2. It will be appreciated that other numbers of grid areas can also be scanned to determine the identity of characters in surrounding grid areas. For example, other embodiments of the present invention contemplate the scanning of 25 grid areas. Here, this translates to a scanning of grid areas A1 through E5. The predetermined maximum scanning value for the number of grid areas to be scanned with a received message is simplified as a maximum number of grid areas to be scanned "K". The processes of scanning the various grid areas is also referred to as performing a "grid walk".

The actual direction of scanning (clockwise for characters moving up, as shown above) may be based on game heuristics. Alternative scanning directions are contemplated as relating to different game scenarios. Accordingly, it is appreciated that an upward movement may suggest the use of clockwise scanning where need be.

Each sector has a value "S" associated with it where S is each sector's "in trouble" factor. This factor relates to how well server 508 is able to keep up with, for example, game physics, and efficiently monitoring, receiving and transmitting update information to said characters 101–110. S is determined by monitoring how well a sector unsuccessfully competes for a server's resources. For example, S is determined by how well the sector competes for system resources. This determination is written to a location in server 508's memory which is later read out when needed. Embodiments of the present invention contemplate this determination also including a check of the memory available to sector 100 in server 508 as well as a check of the number of characters in a sector. As resources are consumed, the sector "in trouble"-ness increases. When sector 100 approaches its maximum capability, it is said to be "in trouble" and S decreases. This is also known as an increase in the sector's processing load.

The values of K and S interrelate in that the number of grid areas actually scanned is the lesser value of K and a value related to S. In this regard, S does not have to be equal to a cardinal number which is later interpreted as the number of grid areas to scan. For example, S has a value range of (0) to (−31). If S is (−24), then the number of grid areas to be scanned is the difference between the maximum value of S and its current value. An example of this distinction is as follows. According to an embodiment of the invention where K is equal to 9, the number of grid areas scanned expands up to 9 grid areas. As S decreases (indicating a loading of the server 508), the scheme determines the number of grid areas to be scanned and limits them accordingly. For instance, if S decreases beyond a minimal value, then the number of grid areas scanned for a received activity from character 101 is decreased from, for example, 9 grid areas to 7 grid areas. In terms of the spiral scanning technique described above, the unscanned grid areas are those areas at the end of the scanning spiral. Using the above example, if S equals (−24), then the scanned grid areas would include, in order, C2, D2, D3, D4, C4, and B4 (leaving off B3 and B2). Present embodiments of the invention also contemplate other scanning orders including raster scanning patterns. In three dimensions, various embodiments of the invention contemplate the use of two two-dimensional scanning patterns. Alternatively, the present embodiments also contemplate the use of a single "corkscrew" pattern.

After determining which characters are within the scanned areas, the system transmits the received activity from the active character to the identified characters. In the example of FIG. 2 with a K value of 9 and no affects from adjustments from S, the characters who would receive the movement update from character 101 (i.e., that character 101 moved to grid C3) includes characters 102 and 103 (in grid area C3), characters 105 and 106 (in grid area D2), and character 104 (in grid area D3). If K was expanded to 25 and no adjustments were due to S, then the additional character 107, 110, 109, and 108 would receive the update activity from character 101 as well.

Figure 3:
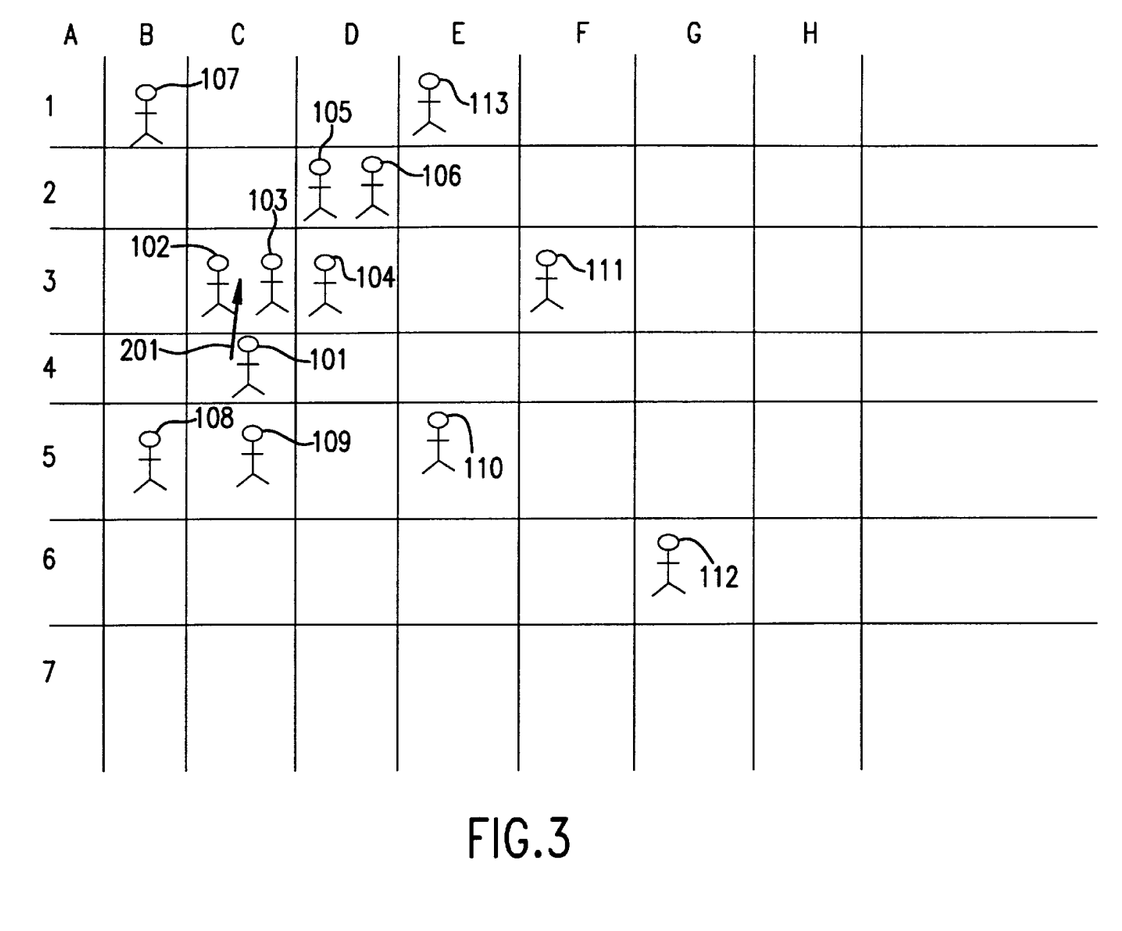
FIG. 3 shows a more expansive view of the sector of FIG. 2 as contemplated by embodiments of the present invention.

FIG. 3 shows an expanded view of sector 100 including more characters 111, 112, and 113 who may or may not be included in the relaying of the movement message regarding the activities of character 101 as determined by the scope of the grid walk.

It should be noted that the movement of character 101 into grid C3 is an example. Embodiments of the present invention also contemplate the same determination for a movement of character 101 even if it only moved within the bounds of grid area C2.

Through using this first scheme of reducing the number of characters to whom an activity is transmitted based on the activity in a sector 100, the system quickly reduces the number of messages which need to be transmitted. Regardless of the throughput of any players computer, the number of players receiving activities from an active character is reduced because of the sector's processing load.

The second scheme of reducing the number of individuals who receive an activity from a first character 101 is to reduce this number based on the individual throughput of each receiving player. Specifically, in server 508, each character has a designated sending queue 509, 510, and 511 which stores messages from server 508 for sending to Players #'s 1, 2, 3. Each player's queue 509, 510, 511 has a maximum queue size. For example, the maximum size may be set at fixed value. To provide some value to the current status of a sending queue, a default window size may be set. For example, present embodiments of the invention contemplate the default transmission window size to be 4096-bytes. As contemplated by embodiments of the present invention, the maximum size is four times the 4096-byte default transmission window size. If the player's queue for the character exceeds this maximum size, this means that few to none of messages intended for a specific player have been sent. In other words, player's queue is backed up and the player is not receiving any messages. At this point, the player is considered dead. The connection to the player is then broken by server 508. In this regard, server 508 is sensitive to the increased backlog in each player's sending queue and determines not to send messages to a backlogged character so as to prevent the queue from being filled up and disconnecting from the player.

The second scheme determines to what extent each player's queue is consumed by pending messages. In this regard, sector 508 determines the activity window 120 for each character. The activity window is simplified by referring to it as each player's windowing factor w (hereinafter, "wfactor"). The wfactor is calculated by $$w = ((M-Q)/C) + S$$

(where w ranges, for example, between 0 to 31)

where M is the maximum number of allowed bytes to be queued for sending, Q is the number of non-in-transit bytes queued for sending, S is the sector's in trouble factor described above, and C is a predetermined constant. It is apparent that the sector's "in trouble" factor S is used to determine which grid areas should be scanned as well as assisting in the determination of the wfactor for each character. In this regard, as the sector becomes more backed up with unsent messages, the wfactor for each character is additionally reduced. Accordingly, each character's activity window is further limited by S when the sector becomes backed up. Alternatively, embodiments of the present invention contemplate the "in trouble" factor S only being used to perform the grid walk so as to minimize extra processing steps.

Referring back to the above relationships, C is determined as follows:

C=M/W where W is the maximum wfactor. For simplicity, W is initially set at 32 for scaling purposes. Using these relationships, wfactor w falls within the following range:

0<w<W.

The maximum number of allowed bytes to be queued for sending from server 508 is determined as follows:

M=A−G where A is a constant "absolute queued maximum" allowed and G is a constant "grace" value (in bytes) to allow for some critical messages to be queued even after the wfactor has shrunk to zero. It is evident that the values selected are dependent on the heuristics of the game application.

Figure 4:
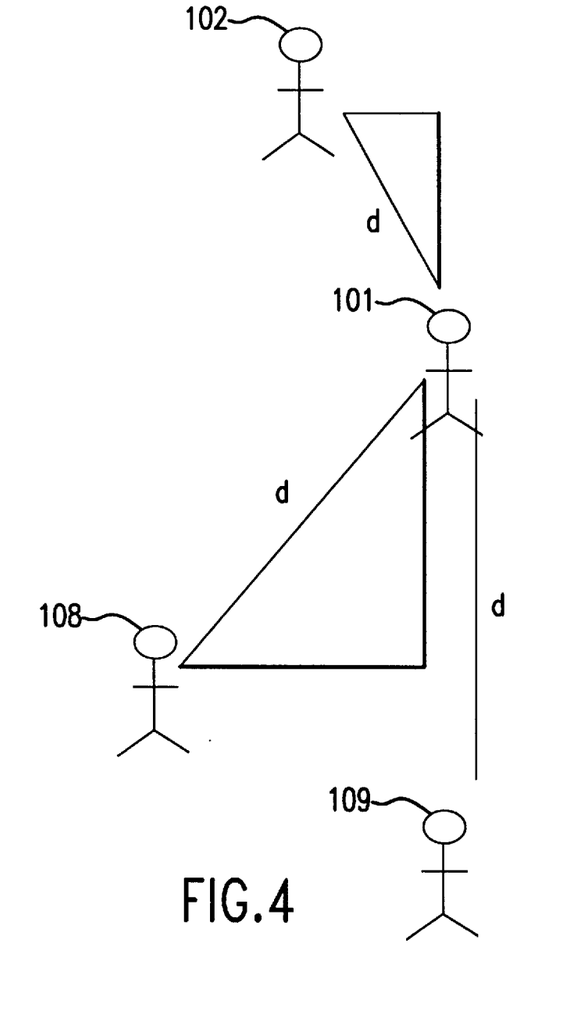
FIG. 4 shows characters separated by distances as contemplated by embodiments of the present invention.

From these preceding relationships, server 508 determines each player's wfactor. Server 508 also determines the distance d from a character 101 submitting an activity to each of the surrounding characters. An example of the surrounding characters is shown in FIG. 4. Each character 102, 108, and 109 is separated by a distance from character 101. Embodiments of the present invention contemplate server 508 determining distance d in a variety of ways including through computing the square and square roots (e.g., the square root of $(x^2+y^2)$) and/or through a simple calculation of x+y. In three dimensions, a z component is added to these calculations to account for three dimensional distance calculations. In an embodiment, because summing is easier to calculate than finding squares and square roots, the sum of the x component and the y component is used to calculate the distance to each character.

The determined distance d to each character is compared against the wfactor of the receiving character to determine whether the activity window for each character 102, 108, and 109 includes character 101 (i.e., to determine the amount to extend or retract the activity window of those characters). Embodiments of the present invention contemplate a variety of methods of determining the scope of the activity window. For example, a first way is to use an equation which relates the wfactor against a constant multiplied by the distance between characters. A second way is to use a look-up table as shown in Table 1.

TABLE 1

| Distance | Wfactor Must Be At Least |
|---|---|
| 0 | 1 |
| up to 10 | 2 |
| up to 20 | 3 |
| up to 30 | 4 |
| up to M | W (maximum wfactor) |
| up to N | No transmission |

Table 1 shows the relationship between the wfactor for each character as needed for reception of character 101's activity as the distance between each character and character 101 increases to distance M, then distance N.

The above described two schemes of determining which characters should receive activity messages from a character are usable together and separately. For example, in some environments where the number of characters in a sector is minimal (or at least fixed to an easily handled number), the second scheme may be favored, where the server 508 determines the wfactor for each character, determines the distance to the active character 101, decides whether each character should receive the message, and relays the received message accordingly.

Figure 6:
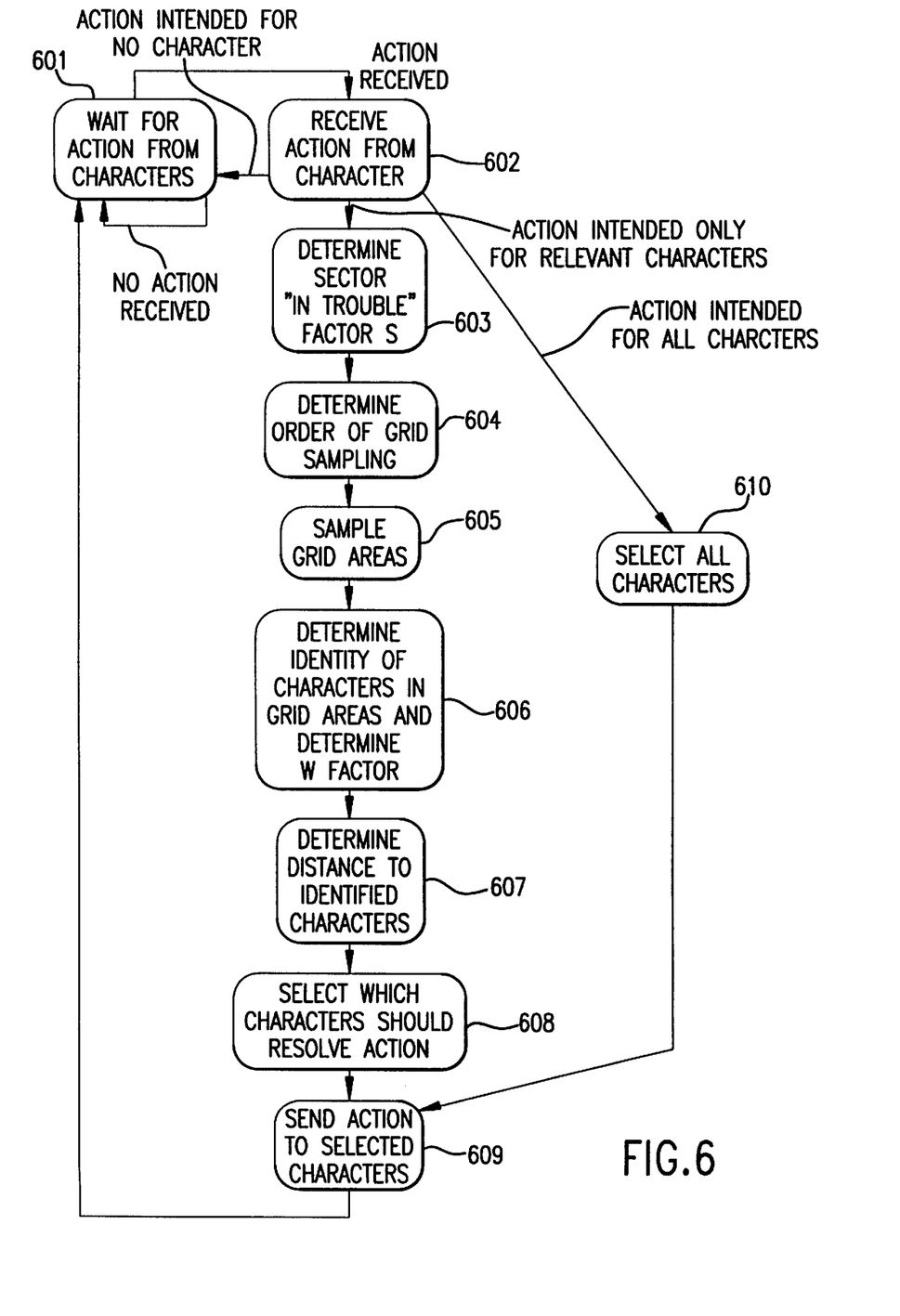
FIG. 6 is a flow diagram of different decision making steps of a scheme which may be performed in accordance with embodiments of the present invention.

FIG. 6 shows a flow diagram of the two schemes used together to determine which characters should receive an action from character 101. These decisions also relate to program modules storable on or in a computer-readable medium for later retrieval. In general, a module refers to a functional unit which may comprise one or more subroutines, objects, or the like, as well as portions of subroutines, objects, or the like.

In referring to FIG. 6, in step 601, the method waits for an action from any of the characters. Once an action is received, the method processes the action to be sure that the received action is the type of action which should be transmitted to the other characters (step 602). At this step, it is also determined whether the received action is relevant to only some characters (e.g., those within a certain geographic distance from the active character). If the action is such that only some characters need be alerted to the action, then the method moves to step 603. If all characters should receive the action, then all characters are selected in step 610 and the method transmits (step) to all selected characters the received action. If no characters should receive the action, then the method steps back to step 601 and waits for the next message from a character.

Step 603 determines the "in trouble" factor S for the sector. The next step 604 determines, based on S, the order and number of grid areas to be scanned for characters. Step 605 then scans the selected grid areas. Step 606 uses the results and determines the identities and wfactors of the found characters. Step 607 determines the distance to the identified characters. Step 608 selects which characters should receive the received action. Step 609 transmits the received action to the selected characters.

It is understood that depending on the configuration of a sector, steps 603–605 may be skipped. This may occur when there are a fixed few characters in a sector. When this occurs, the time required to perform the grid walk is eliminated for faster action processing.

It is apparent that many modifications and variations of the present invention are possible, and references to specific values are by example only. In general, it should be emphasized that the various components of embodiments of the present invention can be implemented in hardware, software or a combination thereof In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using the C or C++ programming language.

It is also to be appreciated and understood that the specific embodiments of the invention described hereinbefore are merely illustrative of the general principles of the invention. Various modifications may be made by those skilled in the art consistent with the principles set forth hereinbefore.

We claim:

1. A computer-implemented method for implementing a multi-user computer world having a sector which defines an area into which two or more user-controlled characters can enter and perform activities, said sector comprising a plurality of sub-sections and said sector having a sector processing load, the method comprising the steps of:

(a) receiving an activity from a first character of said two or more characters in said sector;

(b) determining said sector processing load for said sector;

(c) selecting sub-sections to review based on said sector processing load;

(d) identifying whether any of said two or more characters exist in said selected sub-sections; and in affirmative response to step (d), (e) transmitting said activity to said two or more characters existing in said selected sub-sections.

2. The computer-implemented method of claim 1, wherein said sector processing load relates to said sector's instantaneous difficulty in handling activities from said characters.

3. The computer-implemented method of claim 2, wherein as said sector processing load increases, the number of sub-sections selected in said step (c) decreases.

4. The computer-implemented method of claim 1, wherein said step (c) includes selecting said sub-sections in a predetermined order.

5. The computer-implemented method of claim 4, wherein said predetermined order differs for different activities performed by said character.

6. The computer-implemented method of claim 4, wherein said activities performed by said character include communicating with other characters and movement within said sector.

7. The computer-implemented method of claim 4, wherein said predetermined order includes one of a clockwise and a counterclockwise direction from the sub-section occupied by said first character.

8. The computer-implemented method of claim 1, wherein the computer world is a computer game.

9. A method for implementing a multi-user computer world having a sector which defines an area into which two or more user controlled characters can enter and perform activities, each character having an activity window, the method comprising the steps of:

(a) receiving an activity from a first character of said characters in said sector;

(b) determining a distance from said first character to other characters within said sector;

(c) determining whether said first character is included within said activity window of said other characters;

(d) identifying ones of said other characters based said determining step (c); and (e) transmitting said activity to said ones of said other characters.

10. The computer-implemented method of claim 9, wherein said activity window for each of said other characters relates to an amount of previous activities which have yet to be transmitted to the user related to said character.

11. The computer-implemented method of claim 9, said step (c) further comprises the step of:

(f) determining the activity window of each of said other characters.

12. The computer-implemented method of claim 9, wherein the computer world is a computer game.

13. A computer-implemented method for implementing a multi-user computer world having a sector which defines an area into which two or more user-controlled characters can enter and perform activities, said sector comprising a plurality of sub-sections and said sector having a sector processing load, and each character having an activity window, the method comprising the steps of:

(a) receiving an activity from a first character of said characters in said sector;

(b) determining said sector processing load for said sector;

(c) selecting sub-sections to review based on said sector processing load;

(d) identifying whether any of said two or more characters exist in said selected sub-sections;

(e) determining a distance from said first character to other characters within said selected sub-sections;

(f) determining whether said first character is included within said activity window of said other characters;

(g) identifying ones of said other characters based affirmative response to said step (f); and (h) transmitting said activity to said ones of said other characters.

14. The computer-implemented method of claim 13, wherein said sector processing load relates to said sector's instantaneous difficulty in handling activities from said characters.

15. The computer-implemented method of claim 14, wherein as said sector processing load decreases, the number of sub-sections selected in said step (c) increases.

16. The computer-implemented method of claim 13, wherein said step (c) includes selecting said sub-sections in a predetermined order.

17. The computer-implemented method of claim 16, wherein said predetermined order differs for different activities performed by said character.

18. The computer-implemented method of claim 16, wherein said activities performed by said character include communicating with other characters and movement within said sector.

19. The computer-implemented method of claim 16, wherein said predetermined order includes one of a clockwise and a counterclockwise direction from the sub-section occupied by said first character.

20. The computer-implemented method of claim 13, wherein said activity window for each of said other characters relates to an amount of previous activities which have yet to be transmitted to the user related to said character.

21. The computer-implemented method of claim 13, said step (f) further comprises the step of:

(i) determining the activity window of each of said other characters.

22. The computer-implemented method of claim 13, wherein the computer world is a computer game.

23. A system for controlling the transmission of an activity from a first character to other characters, said system including a plurality of computers each supporting a user, wherein each user is associated with at least one of said characters, said characters located within a sector each of which defines an area into which users enter and perform activities, said sector divided into at least two sub-sections, said system comprising:

a plurality of computers coupled to a server; and, a first process executing on a first of the plurality of computers, wherein the first process transmits an activity to said server;

a second process executing on said server, wherein the second process receives the transmitted activity, selects ones of the plurality of computers for receiving the activity from the first of the plurality of computers, and transmits the activity to the selected ones of the plurality of computers, wherein each of said selected ones of the plurality of computers is associated with at least one of said characters;

wherein the ones of the plurality of computers are selected based on at least one of (1) an amount of untransmitted information pending for each of the plurality of computers, (2) a sector processing load for the sector, or (3) a distance between a character representing a user using the first of the plurality of computers and each of characters representing users of the plurality of computers.

24. The system according to claim 23, wherein the ones of the plurality of computers are selected based on at least two of (1) the amount of untransmitted information messages pending for each of the plurality of computers, (2) the sector processing load for the sector, or (3) the distance between the character representing the user using the first of the plurality of computers and each of characters representing users of the plurality of computers.

25. The system according to claim 24, wherein amount of untransmitted information is determined by the number of untransmitted bytes.

26. The system according to claim 24, wherein amount of untransmitted information is determined by the amount of untransmitted messages.

27. The system according to claim 23, wherein the ones of the plurality of computers are selected based on (1) the amount of untransmitted information pending for each of the plurality of computers, (2) the sector processing load for the sector, and (3) the distance between the character representing the user using the first of the plurality of computers and each of characters representing users of the plurality of computers.

28. The system according to claim 27, wherein amount of untransmitted information is determined by the number of untransmitted bytes.

29. The system according to claim 27, wherein amount of untransmitted information is determined by the amount of untransmitted messages.

30. The system according to claim 23, wherein amount of untransmitted information is determined by the number of untransmitted bytes.

31. The system according to claim 23, wherein amount of untransmitted information is determined by the amount of untransmitted messages.

32. A computer-readable storage medium for sending activity messages from a first location to a first remote location where the activity messages are selectively sent to other remote locations from the first remote location comprising:

a first module for generating an activity message at the first location, said first module implementing a representation of a computer world where the activity message is generated based on occurrences in the representation of the computer world;

a second module for transmitting the activity message to the first location to the first remote location, wherein at the first remote location, the activity message is selectively transmitted to the other remote locations from the first remote location based on a determination of relevance of sending the activity message to the remote locations.

33. The computer-readable storage medium of claim 32, wherein the computer world is a computer game.

34. The computer-readable storage medium of claim 32, wherein the activity message is selected from the group of movement messages and communication messages.

35. A computer-readable storage medium for selectively sending at a local location activity messages received from a first remote location to other remote locations comprising:

a first module for receiving an activity message at the local location, said first module implementing a representation of a computer world where the activity message relates to the representation of the computer world;

a second module for determining the operating state of the representation of the computer world;

a third module for determining where, in the representation of the computer world, representations of entities designating the other remote locations are located and the status of the representations of the entities;

a fourth module for selecting which of said other remote locations as represented by said representations of entities should receive the activity message based on the determination of said third module;

a fifth module for transmitting the activity message from the local location to the selected other remote locations.

36. The computer-readable storage medium of claim 35, wherein the computer world is a computer game.

37. The computer-readable storage medium of claim 35, wherein the activity message is selected from the group of movement messages and communication messages.

38. The computer-readable storage medium of claim 35, wherein the third module determines the distance between the representations of the entities.

39. A computer-readable medium for implementing a multi-user computer world, having a sector which defines an area into which two or more user-controlled characters can enter and perform activities, said sector comprising a plurality of sub-sections and said sector having a sector processing load, by performing the steps of:

(a) receiving an activity from a first character of said two or more characters in said sector;

(b) determining said sector processing load for said sector;

(c) selecting sub-sections to review based on said sector processing load;

(d) identifying whether any of said two or more characters exist in said selected sub-sections; and in affirmative response to step (d), (e) transmitting said activity to said two or more characters existing in said selected sub-sections.

40. The computer-readable medium of claim 39, wherein said sector processing load relates to said sector's instantaneous difficulty in handling activities from said characters.

41. The computer-readable medium of claim 39, wherein said step (c) includes selecting said sub-sections in a predetermined order.

42. The computer-readable medium of claim 41, wherein said predetermined order differs for different activities performed by said character.

43. The computer-readable medium of claim 40 wherein as said sector processing load increases, the number of sub-sections selected in said step (c) decreases.

44. A computer readable medium for implementing a multi-user computer world, having a sector which defines an area into which two or more user controlled characters can enter and perform activities, each character having an activity window, by comprising the steps of:

(a) receiving an activity from a first character of said characters in said sector;

(b) determining a distance from said first character to other characters within said sector;

(c) determining whether said first character is included within said activity window of said other characters;

(d) identifying ones of said other characters based said determining step (c); and (e) transmitting said activity to said ones of said other characters.

45. The computer-readable medium of claim 44, wherein said activity window for each of said other characters relates to an amount of previous activities which have yet to be transmitted to the user related to said character.

46. The computer-readable medium of claim 44, said step (c) further comprises the step of:

(f) determining the activity window of each of said other characters.

* * * * *